United States Patent
Hinze et al.

(10) Patent No.: US 7,600,808 B2
(45) Date of Patent: Oct. 13, 2009

(54) UTILITY VEHICLES WITH SPECIAL CAB

(75) Inventors: Peter Hinze, Altomünster (DE); Friedrich Beer, Bad Hall (AT); Franz Ribo, Vienna (AT); Robert Wimmer, Dietach (AT)

(73) Assignee: MAN Nutzfahrzeuge Österreich AG, Vienna (AT)

( * ) Notice: Subject to any disclaimer, the term of this patent is extended or adjusted under 35 U.S.C. 154(b) by 0 days.

(21) Appl. No.: 12/196,961

(22) Filed: Aug. 22, 2008

(65) Prior Publication Data

US 2009/0058137 A1   Mar. 5, 2009

(30) Foreign Application Priority Data

Aug. 31, 2007   (DE) .................. 10 2007 041 277

(51) Int. Cl.
*B62D 33/06*   (2006.01)

(52) U.S. Cl. .................. 296/190.08; 296/190.04; 89/36.08

(58) Field of Classification Search ............ 296/190.08, 296/190.01, 190.04, 190.02, 204, 187.07, 296/37.6, 35.1; 89/36.08; 180/89.13

See application file for complete search history.

(56) References Cited

U.S. PATENT DOCUMENTS

| | | | | |
|---|---|---|---|---|
| 5,310,239 A | * | 5/1994 | Koske et al. | 296/26.08 |
| 6,935,679 B2 | * | 8/2005 | Myers et al. | 296/190.02 |
| 2002/0021026 A1 | * | 2/2002 | Ishida et al. | 296/190.08 |

* cited by examiner

*Primary Examiner*—Joseph D Pape
(74) *Attorney, Agent, or Firm*—Cohen Pontani Lieberman & Pavane LLP

(57) ABSTRACT

A utility vehicles, in particular for military purposes, with a chassis and a cab arranged on the frame of said chassis so that it can be tilted. The cab has a front module and a rear module. The front module forms a cabin for the driver and co-driver. The rear module forms a hood-like protective and stowage space for vehicle aggregates, parts and accessories. The floor of the front module is reinforced by two longitudinal floor members extended through the front module rear wall by supporting brackets to support the rear module. There are supports so that the rear module, can rest on the extended supporting brackets of the longitudinal floor members. On the front module rear wall and at the front of the rear module bearer frame there are matching supporting and joining elements at different levels with flush boreholes or through-holes through which screws can be threaded to securely join the two cab modules on a longitudinal, crosswise and vertical axis, and also enabling them to be released.

17 Claims, 20 Drawing Sheets

UTILITY VEHICLES WITH SPECIAL CAB

FIELD OF THE INVENTION

The subject of the invention is utility vehicles, in particular for military purposes, with a chassis and a cab arranged on the frame of said chassis so that it can be tilted.

BACKGROUND OF THE INVENTION

In the case of utility vehicles for special purposes, also military vehicles, the cab and also aggregate carriers installed behind it are in very many cases matched to the intended purpose. An example is the refuse collection vehicle of patent EP 1637438 A2 with its low-entry cab and the aggregate carrier arranged behind it on the chassis that in this case also assumes the function of the rear cab suspension. A military vehicle is also familiar from patent EP 1640251 A1 in which, behind the cab and spaced from the latter on a specially formed subframe, an enclosed aggregate frame is arranged that is capable of holding at least one cooling aggregate. In similar fashion, in the utility vehicle familiar from patent AT 410308 B, a number of vehicle aggregates and parts are comprised behind its cab in a supporting frame to form a compact assembly.

Common to all three known vehicles is that the aggregate carriers together with the vehicle components they carry form a self-contained assembly that is firmly arranged on the frame, and furthermore is not joined to the cab in any way. In all three known cases the cab can be tilted during repair or maintenance for access to the engine, clutch and transmission, which are partly below the cab and partly below the aggregate carrier.

In the known cases the space for the bodywork of the utility vehicle is determined by the aggregate carriers set back from the cab, and in many cases this is too heavily restricted, particularly in length.

SUMMARY OF THE INVENTION

The purpose of the invention is consequently to create a utility vehicle in which less space is required, especially in the lengthwise direction of the vehicle, for the protected housing of vehicle aggregates and other parts and accessories.

The inventive utility vehicle is characterized by a special two-part cab composed of a front module and a rear module. The front module forms a cabin for the driver and co-driver, while the rear module immediately behind this forms a hood-like protective and storage compartment for the power aggregate and other vehicle parts and accessories such as radiator, fan, air intake pipe, air intake box and air filter, battery box, compressed air and other reservoirs, etc. The rear module is borne by the floor members of the cab front module, lengthened for this purpose by appropriate supporting brackets. The rear module is attached to the front module at the bottom on the above mentioned supporting brackets and again at the top by the joining and attachment means that are part of the framework of spars reinforcing the front module rear wall. Entirely within the meaning of the intended purpose therefore, the inventive embodiment of the cab reduces the gap between the actual driver/co-driver cabin and the means for accommodating/stowing the vehicle parts, aggregates and accessories behind it to virtually zero, which is advantageous in lengthening the space for bodywork or other use of the utility vehicle.

BRIEF DESCRIPTION OF DRAWINGS

Other advantages of the inventive solution can be seen from the following description of an example of embodiment of the utility vehicle according to the invention. The drawings show.

DETAILED DESCRIPTION OF PREFERRED EMBODIMENT

The invention applies in general to utility vehicles with a cab arranged on the frame of a chassis so that it can be tilted. As an example of application the drawings show those sections of a military vehicle that enable the invention to be understood.

Figure 18:
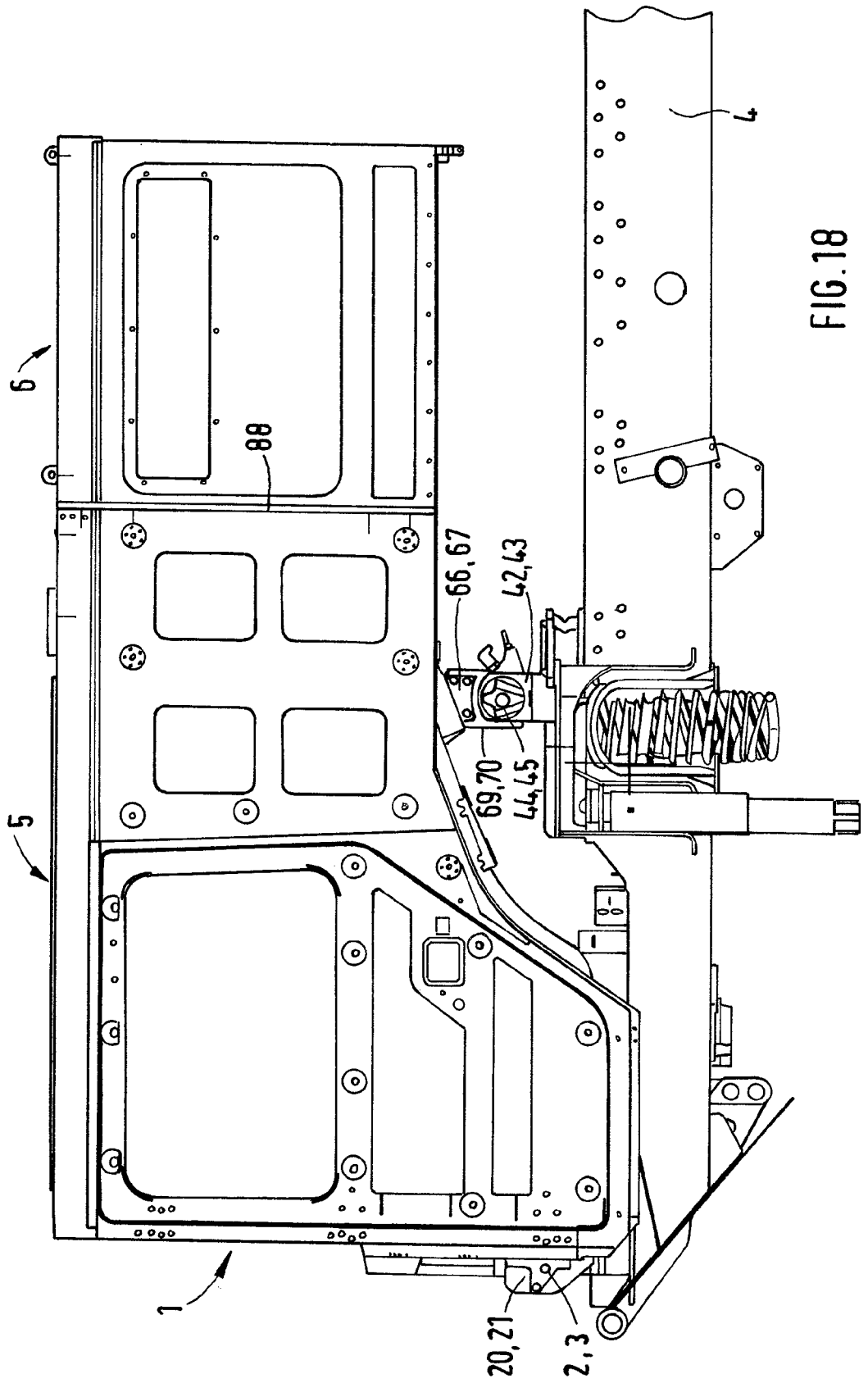
FIG. 18 depicts the inventive cab attached to the chassis frame of a utility vehicle.

It can be assumed that the cab 1 of the utility vehicle is attached by front bearings 2 and 3, not shown in detail, to the chassis frame 4, said bearings forming the axle on which the cab 1 is tilted as shown in FIG. 18. The chassis frame 4 consists of two frame side members joined by cross-members.

According to the invention the cab 1 is composed of a front module 5 and a rear module 6. The details of the two cab modules 5, 6 are easy to see in FIG. 1 and, once ready assembled, in FIG. 18. What follows are further details of the invention.

The cab front module 5 exhibits a front wall 7, a left side wall 8, a right side wall 9, a rear wall 10, a floor 11 and a roof 12, and forms a self-contained cabin for the driver and co-driver. The drawing only shows the cab in white, i.e. for the sake of clarity without any built-on and built-in parts in the walls of the cab such as doors, windscreens, roof fittings, interior fixtures.

Figure 14:
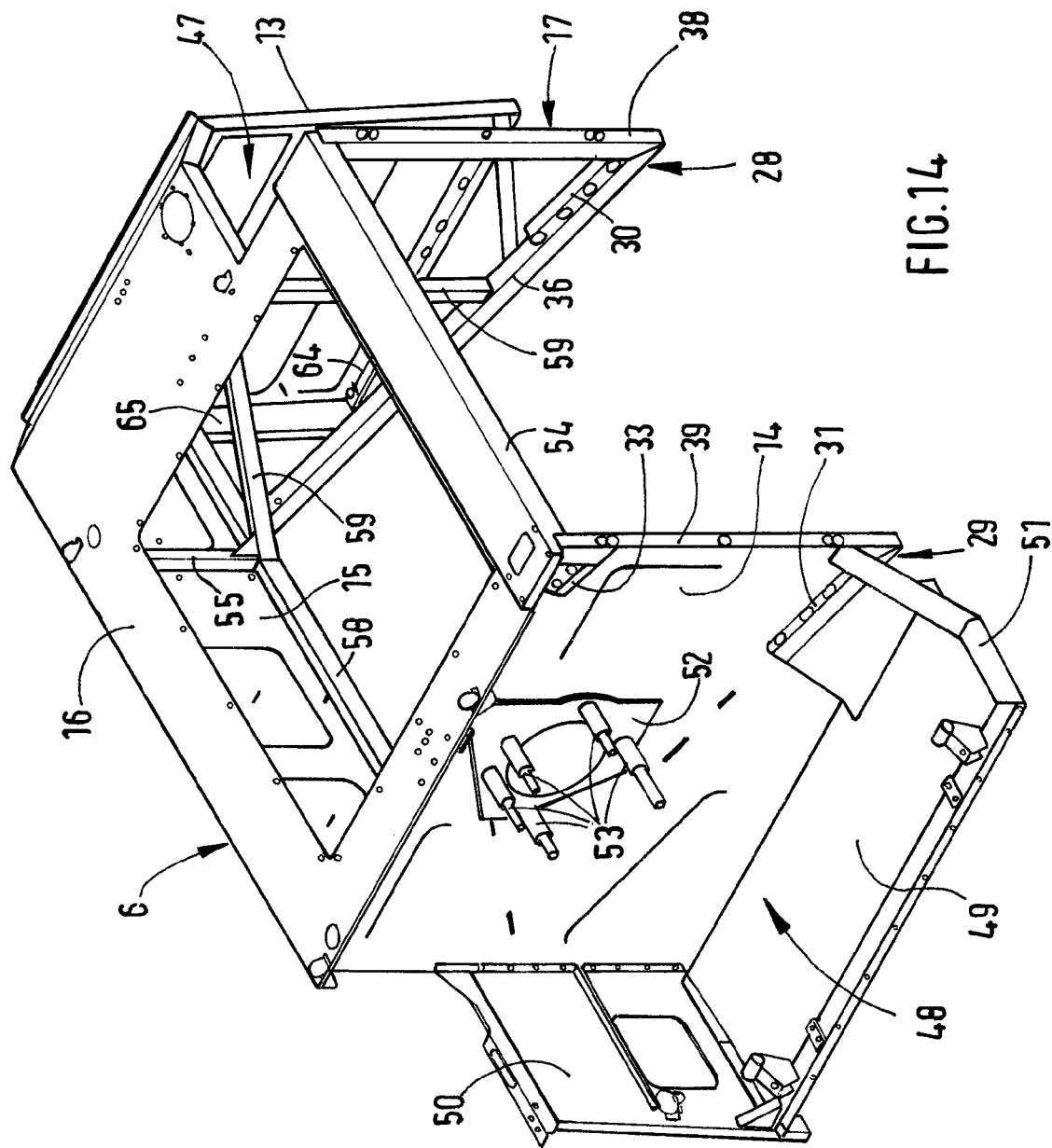
FIG. 14 depicts the cab rear module of FIG. 1 in perspective from top front right.
Figure 15:
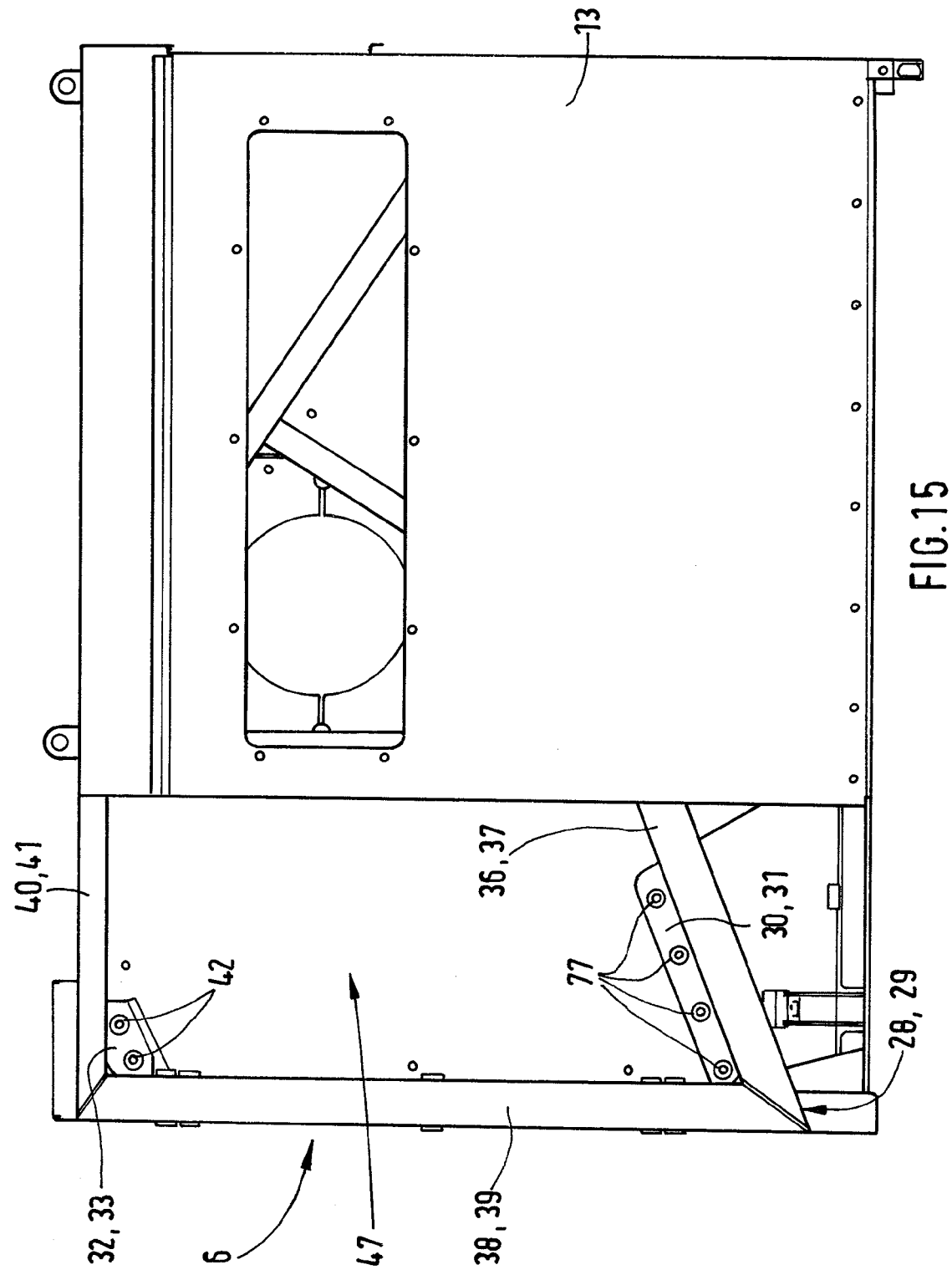
FIG. 15 depicts the cab rear module of FIG. 1 from the left.
Figure 16:
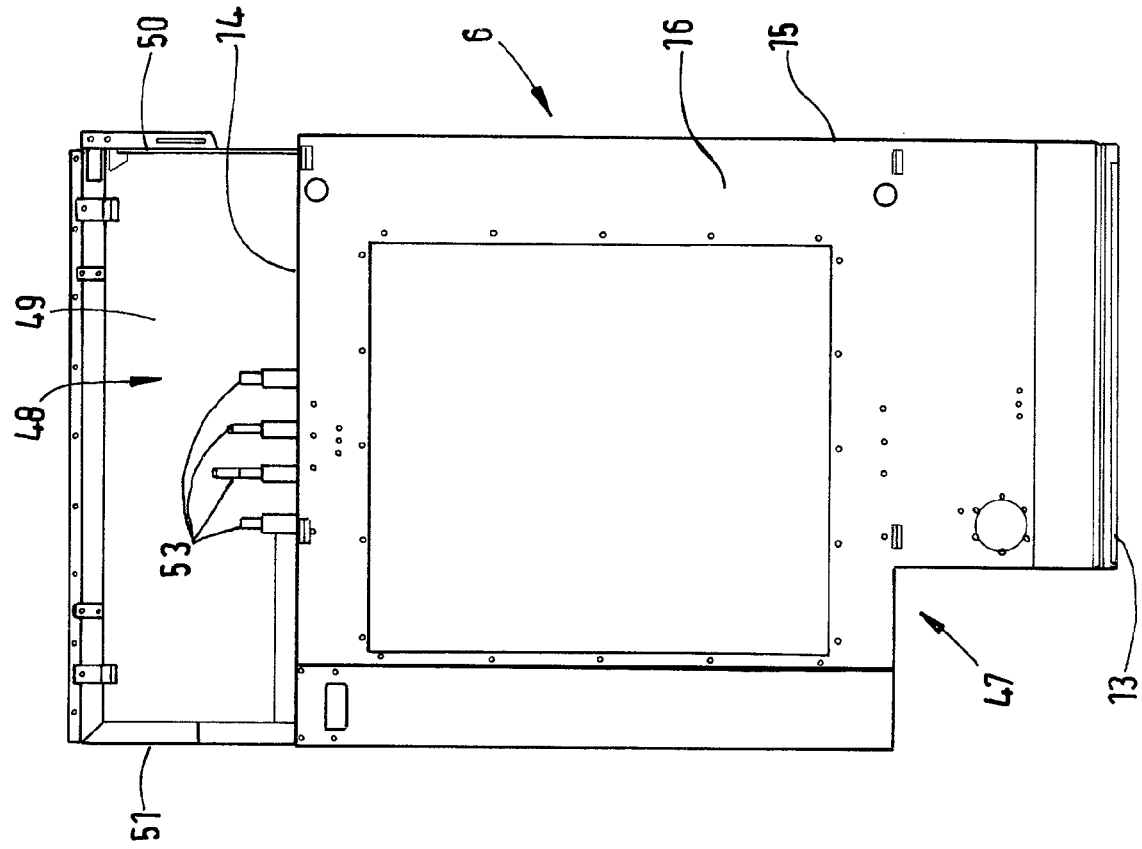
FIG. 16 depicts the cab rear module of FIG. 1 in plan view.
Figure 17:
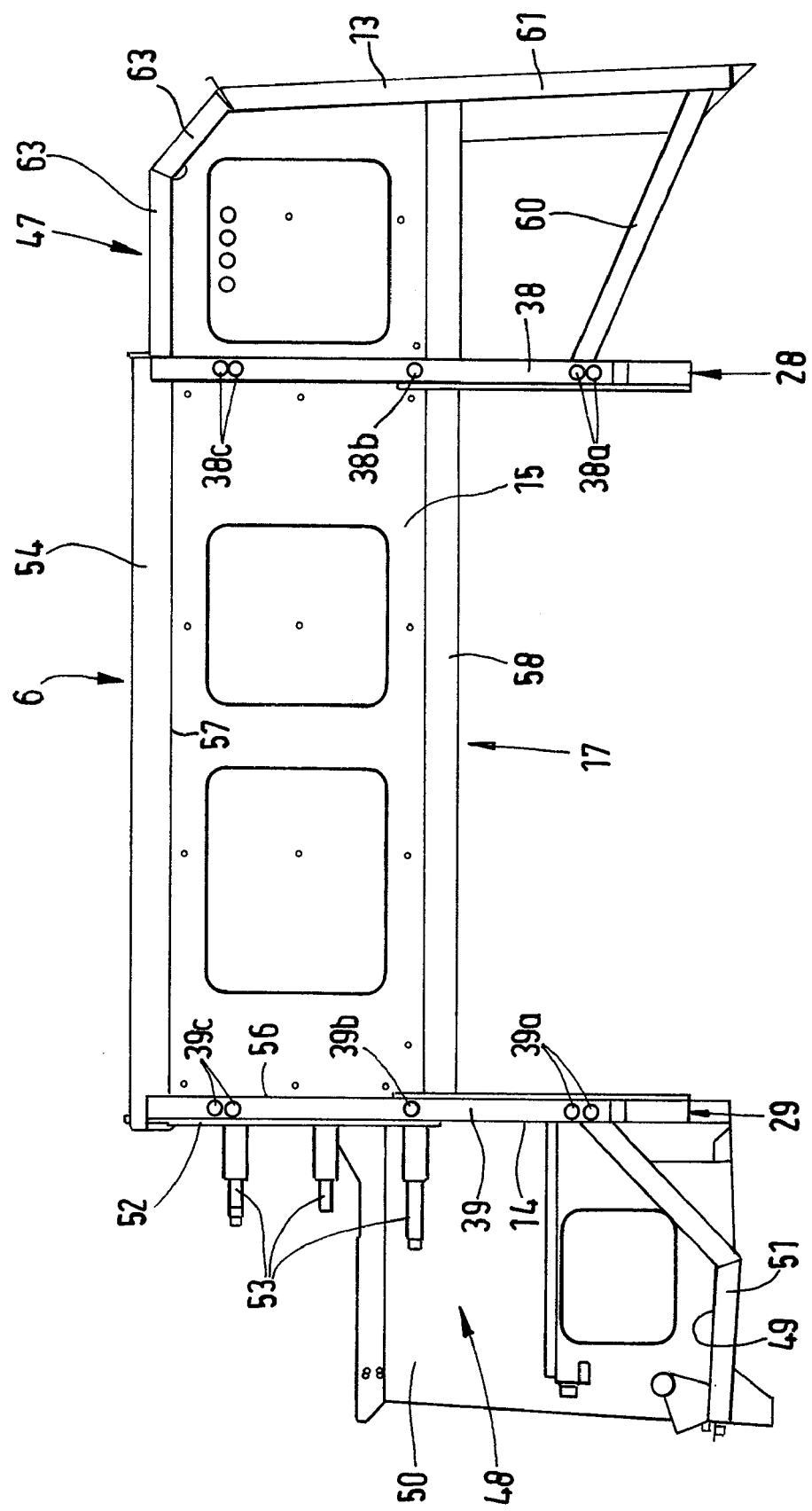
FIG. 17 depicts the cab rear module of FIG. 1 from the front.

The cab rear module 6 in the example shown, for example in FIG. 14, exhibits a bearer frame 17 enclosed by a left side wall 13, a right side wall 14 and at least in part by further walls 15, 16, and forms a hood-like protective and storage space for the power aggregate and other vehicle parts and accessories such as radiator, fan, air intake pipe, air filter, compressed air and fuel tanks, batteries, spare wheel.

The floor 11 of the cab front module S is reinforced by two longitudinal floor members 18, 19. At the front end of each of these in the illustrated example there is a case 20, 21 for a front cab bearing 2, 3, which is not shown in detail however. At its rear end each of the two longitudinal floor members 18, 19 joins a supporting bracket 22, 23 that projects beyond the front module rear wall 10. According to the invention the longitudinal floor members 18, 19 with the attached supporting brackets 22, 23 function as carriers for the cab rear module 6. As reinforcement the front module rear wall 10 exhibits a framework formed of a number of spars. In the present example the two vertical spars numbered 24, 25 are of interest because they carry various front module supporting and joining means that are subsequently described in more detail. These supporting and joining means at different levels on the front module rear wall 10 match supporting and joining means at the front of the rear module bearer frame 17. The matching supporting and joining means have flush boreholes or holes—see FIG. 19, 20 in particular—through which screws can be passed to securely join the two cab modules 5, 6 on a longitudinal, transverse and vertical axis, and enable them to be separated again.

What follows are further details of the inventive design.

Figure 1:
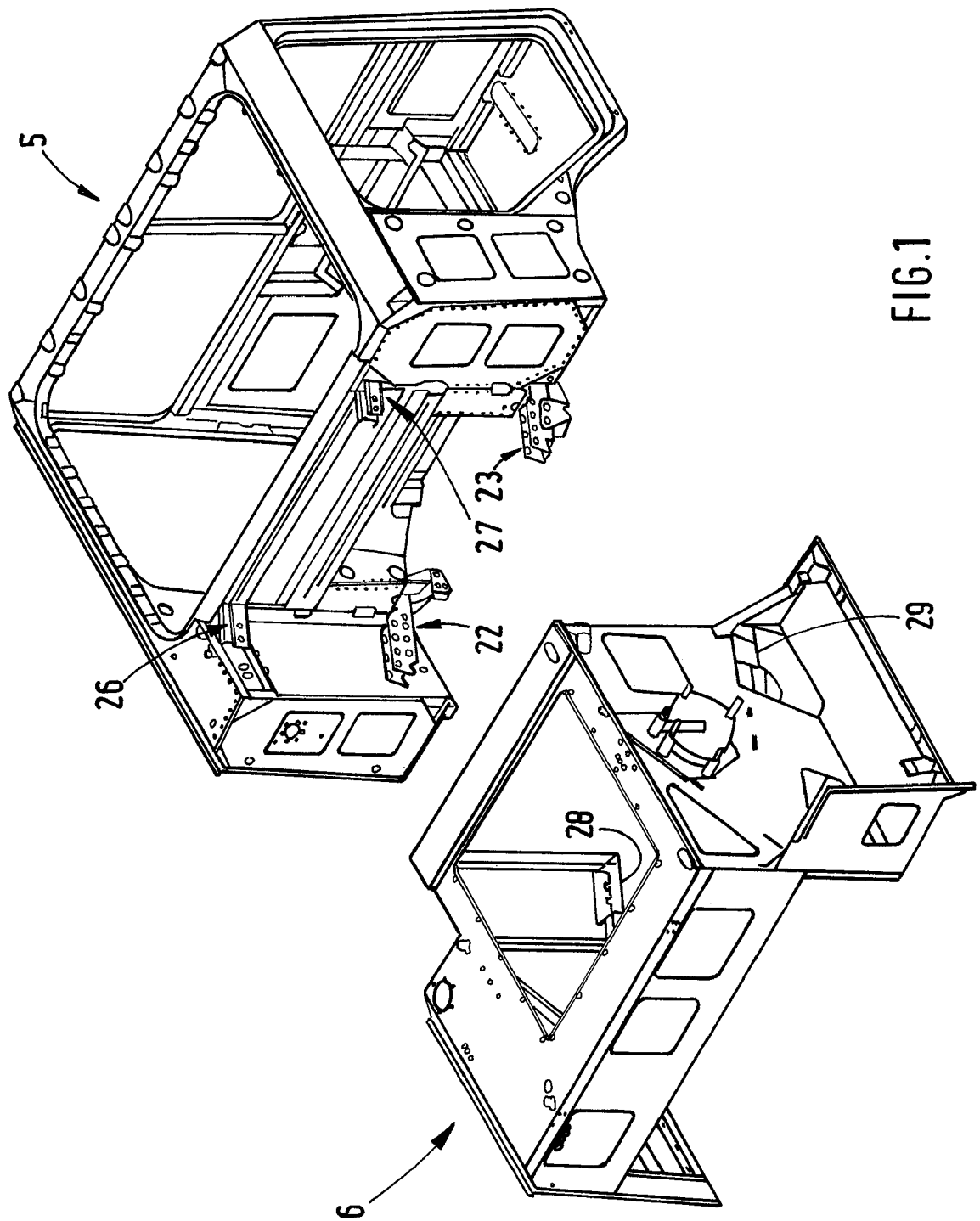
FIG. 1 depicts a dual-module cab as a body in white without added-on and built-in parts in an exploded perspective of the cab front module and rear module in accordance with one embodiment of the invention.
Figure 2:
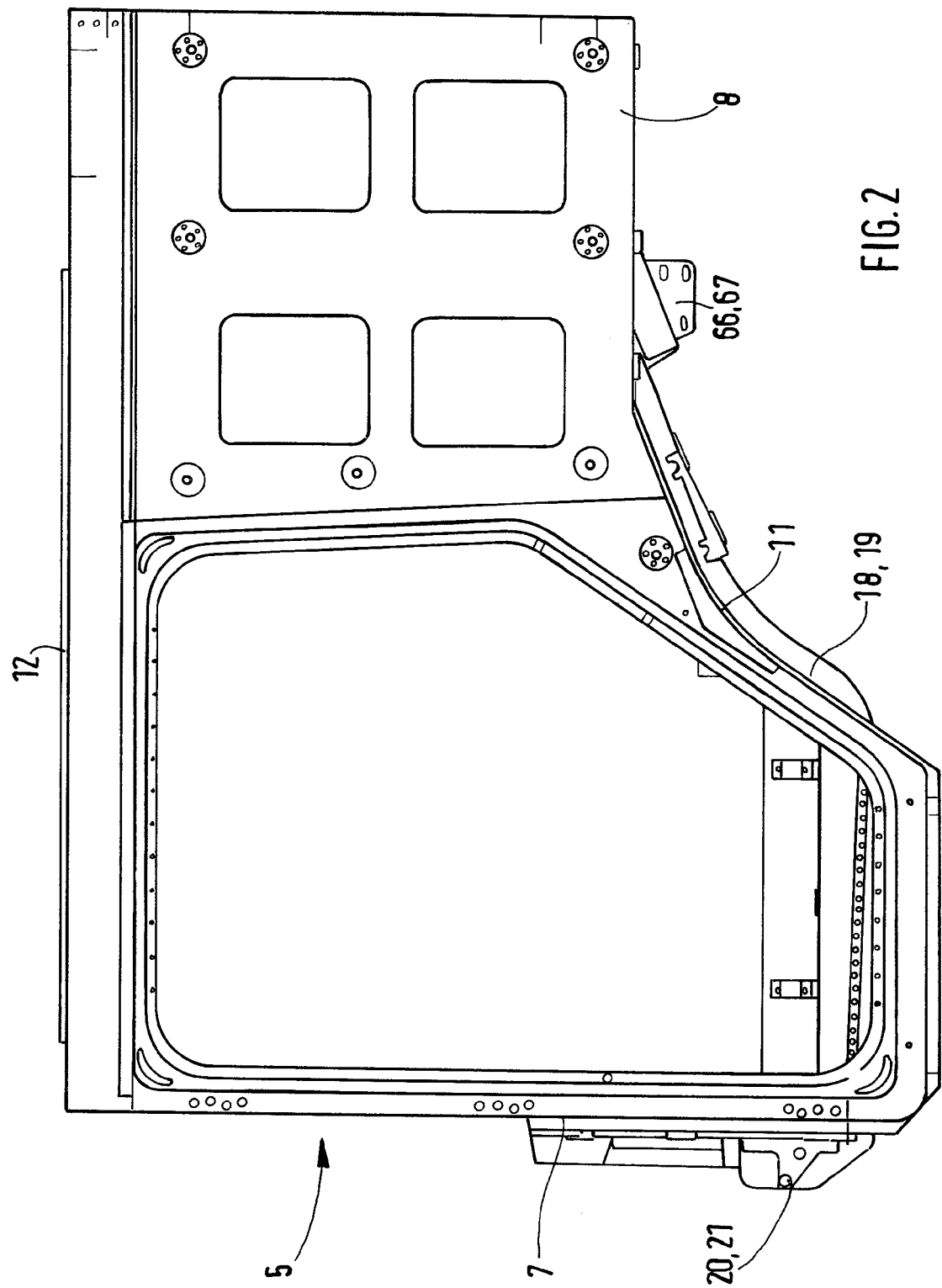
FIG. 2 depicts the cab front module of FIG. 1 from the left.
Figure 3:
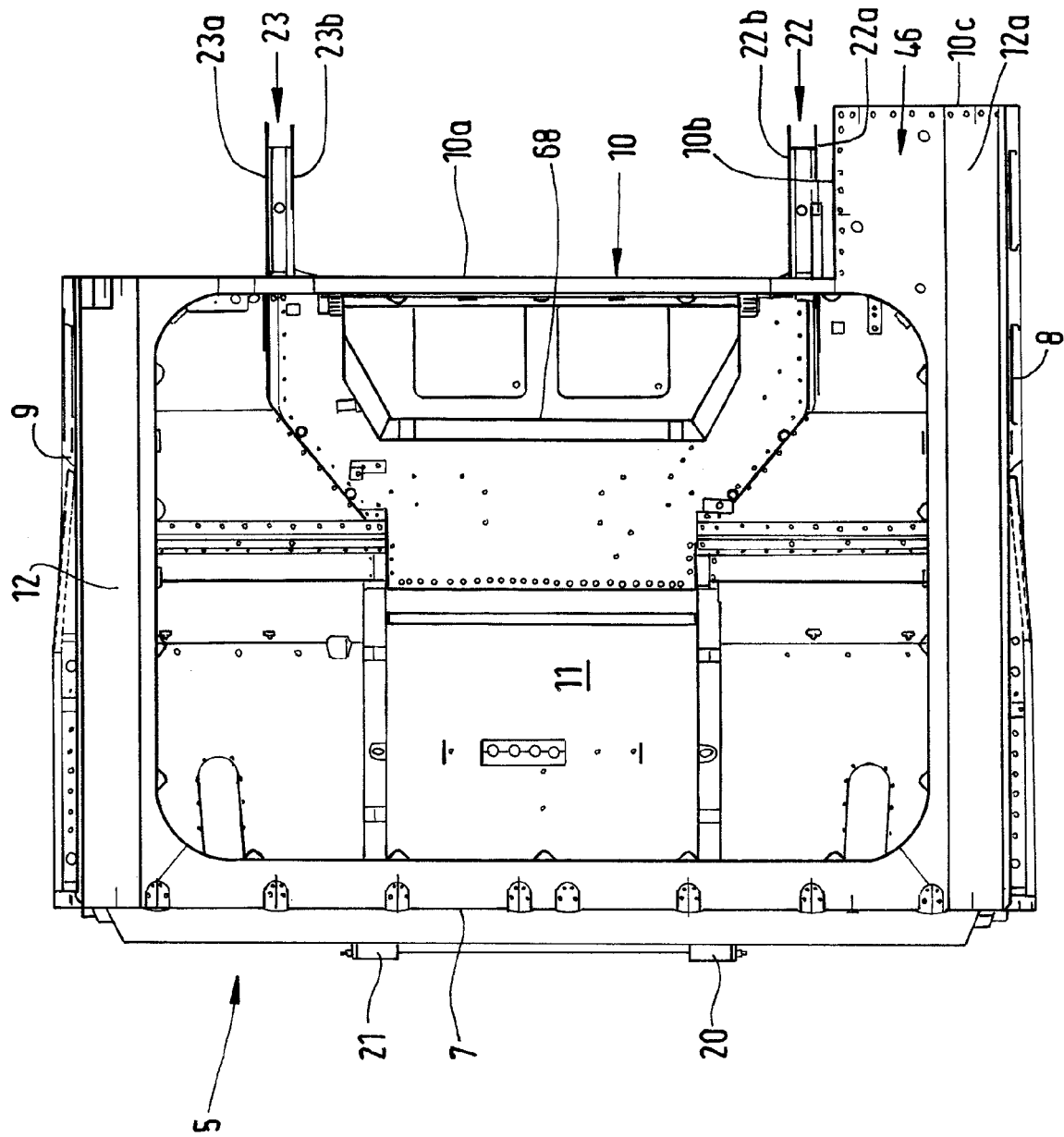
FIG. 3 depicts the cab front module of FIG. 1 in plan view.
Figure 4:
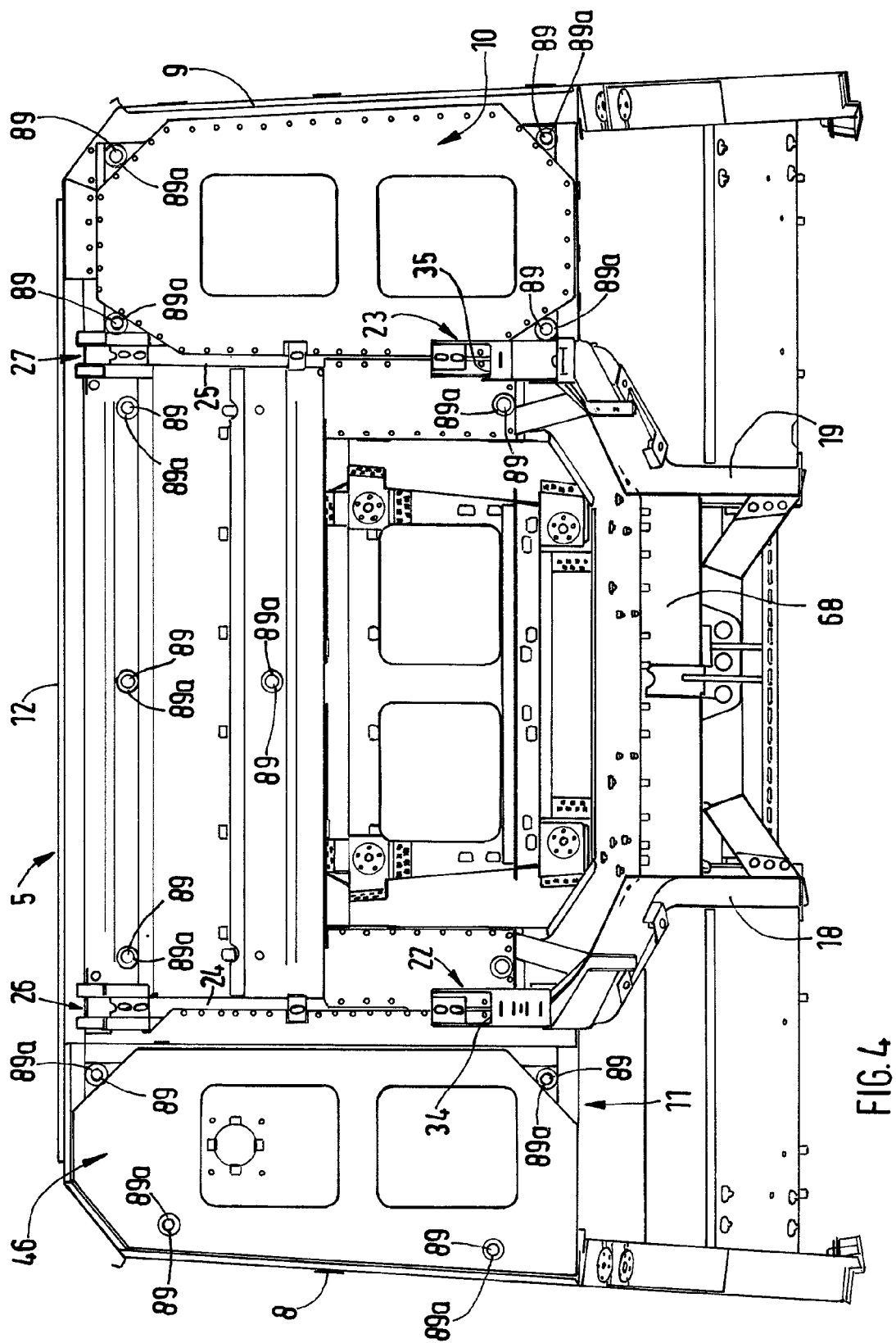
FIG. 4 depicts the cab front module of FIG. 1 from the rear.
Figure 5:
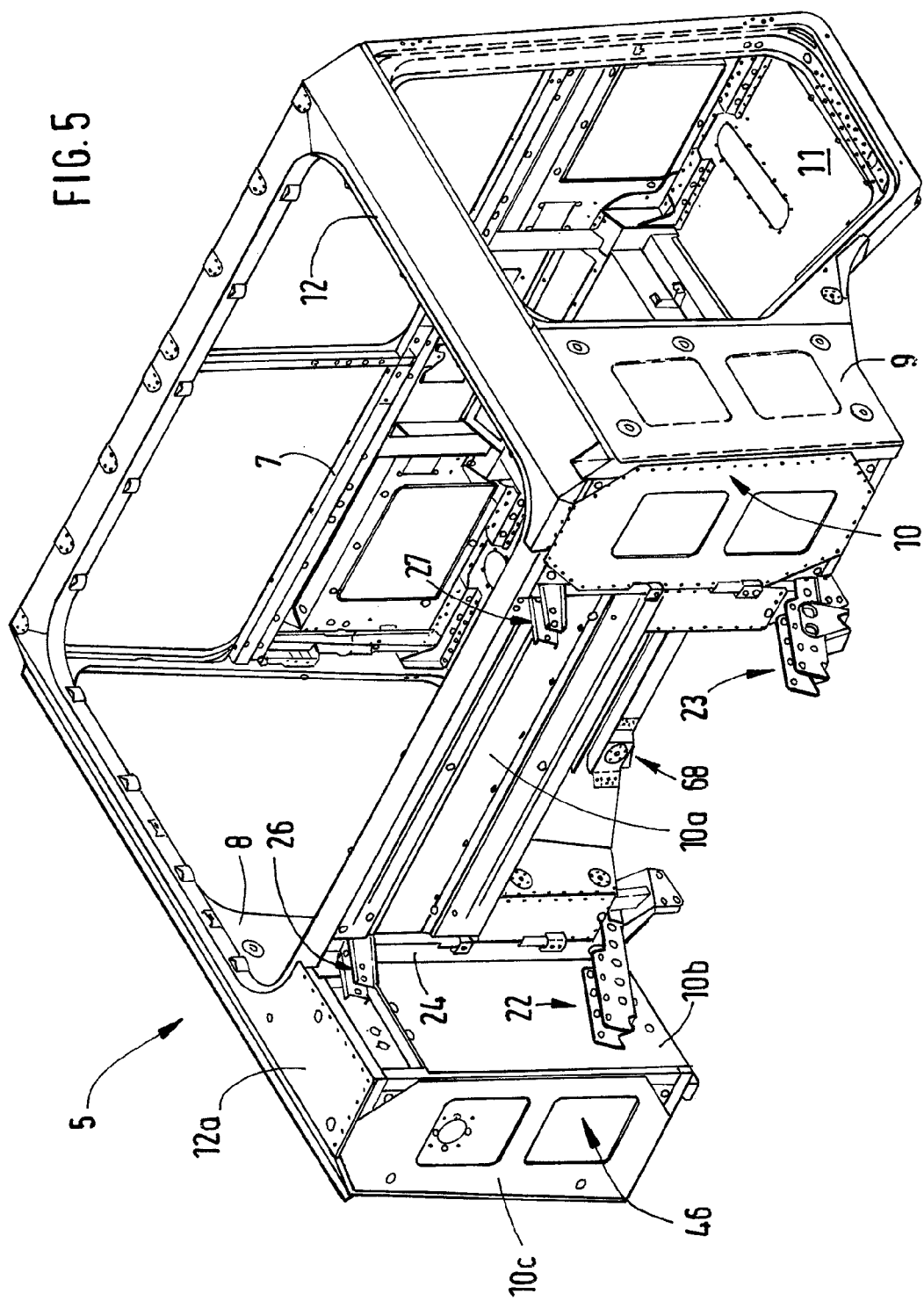
FIG. 5 depicts the cab front module of FIG. 1 in perspective from top rear right.
Figure 6:
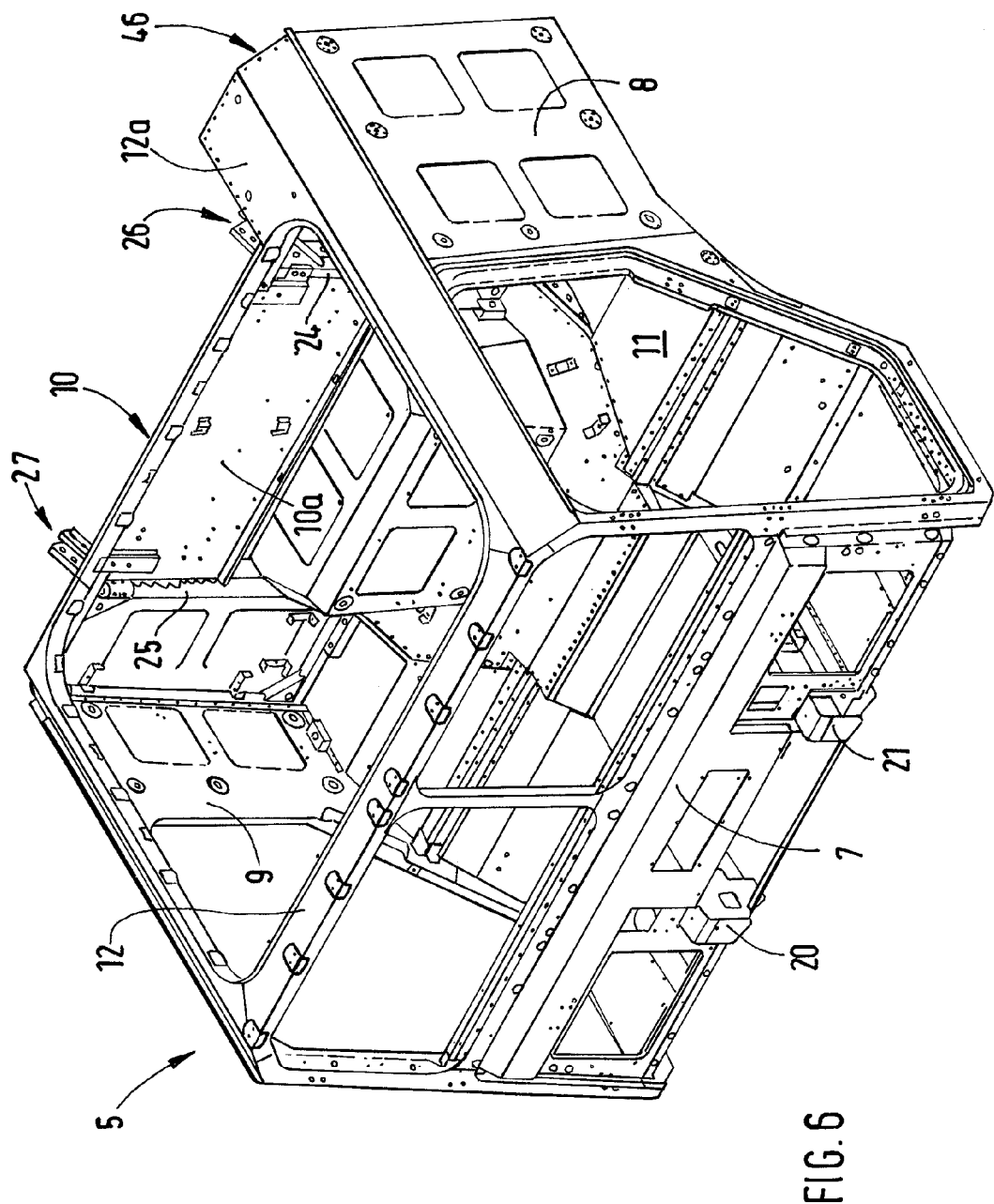
FIG. 6 depicts the cab front module of FIG. 1 in perspective from top front left.
Figure 7:
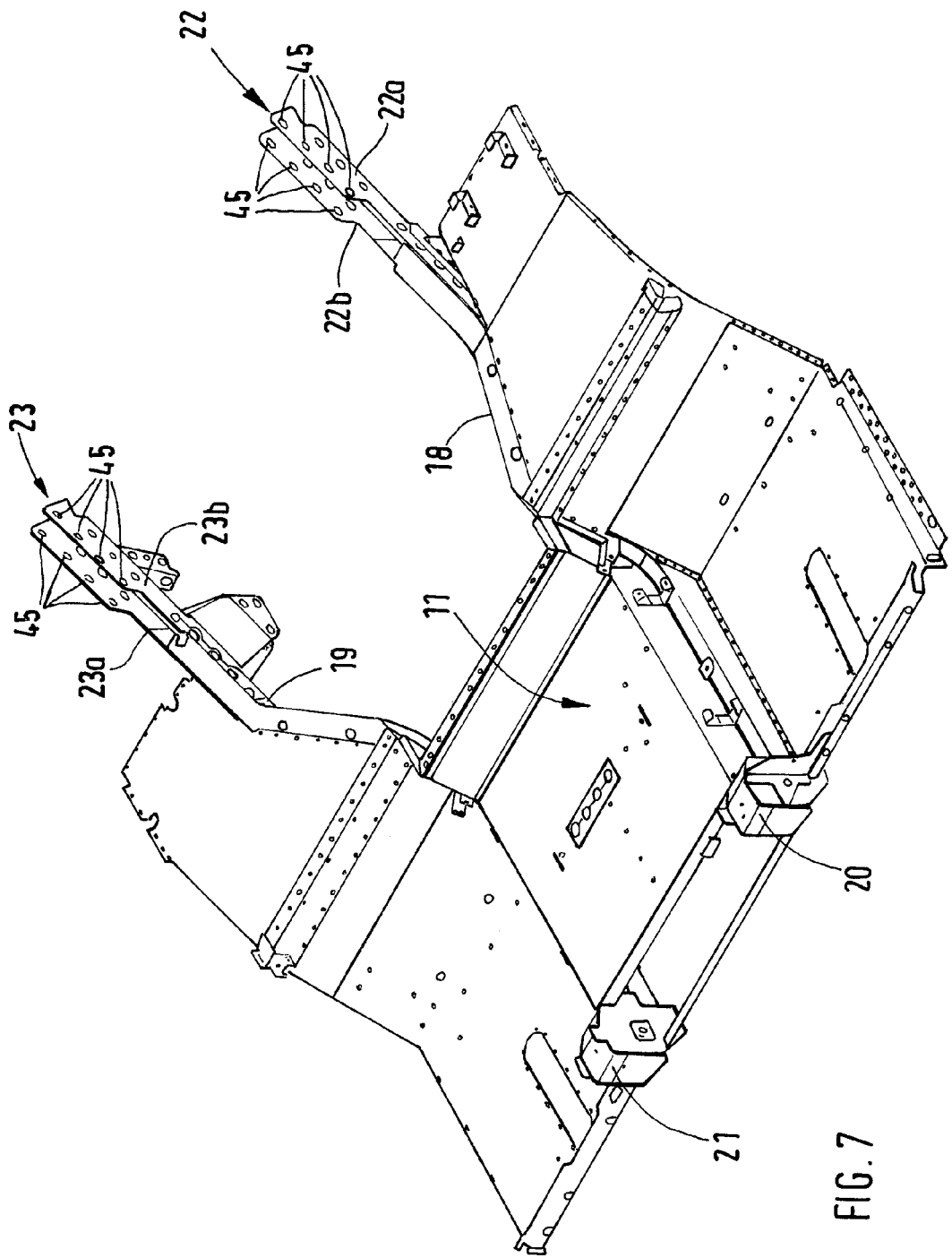
FIG. 7 depicts the floor assembly of the cab front module of FIG. 1 in perspective from top front left.
Figure 8:
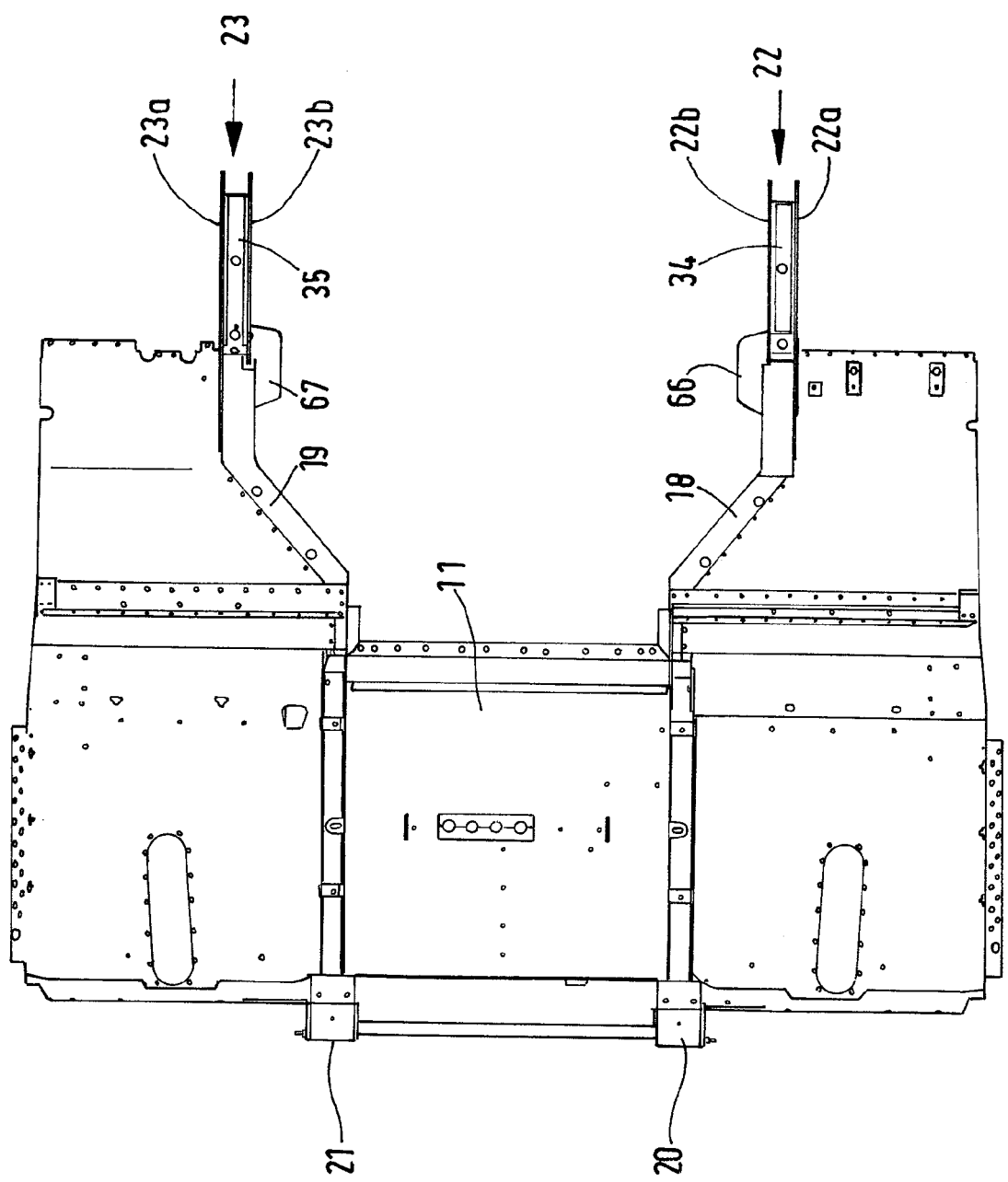
FIG. 8 depicts the floor assembly of the cab front module of FIG. 1 in plan view.
Figure 9:
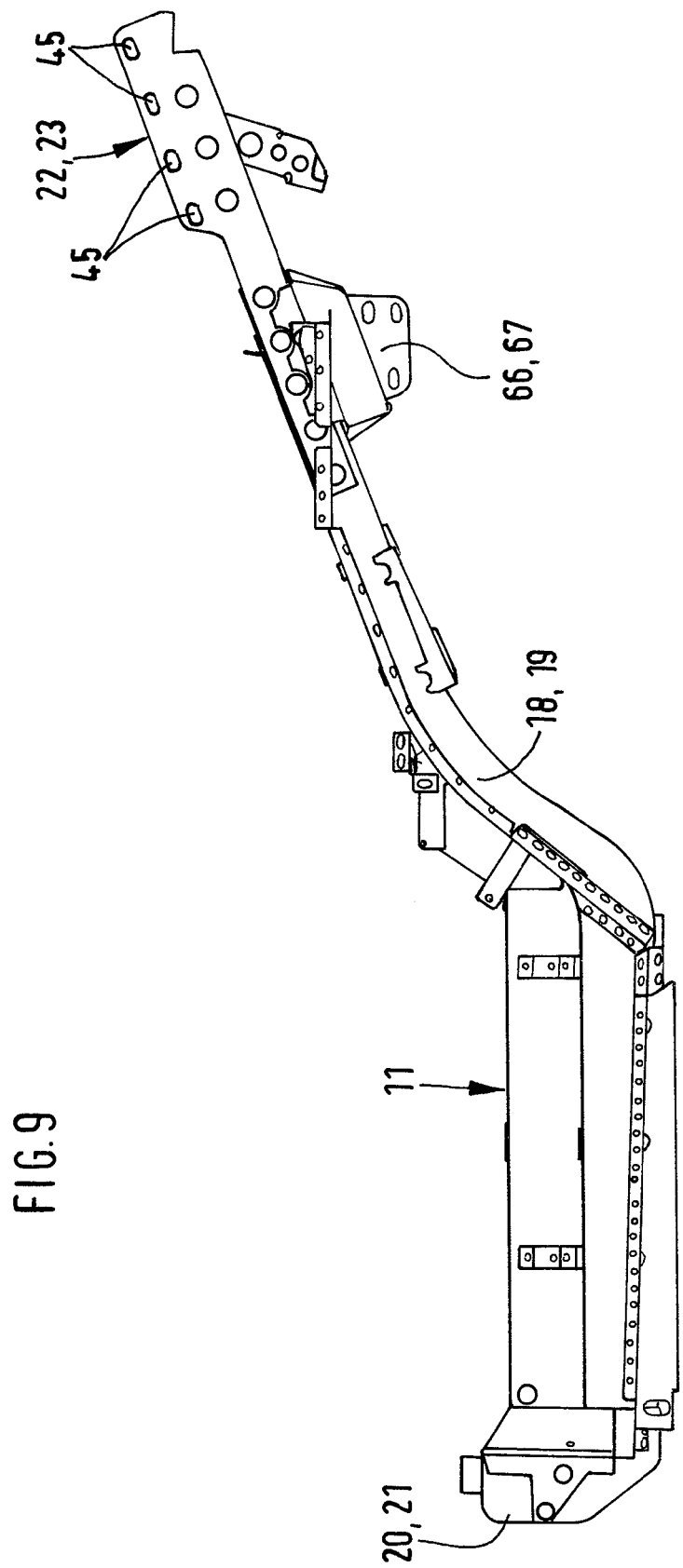
FIG. 9 depicts the floor assembly of the cab front module of FIG. 1 from the left.
Figure 10:
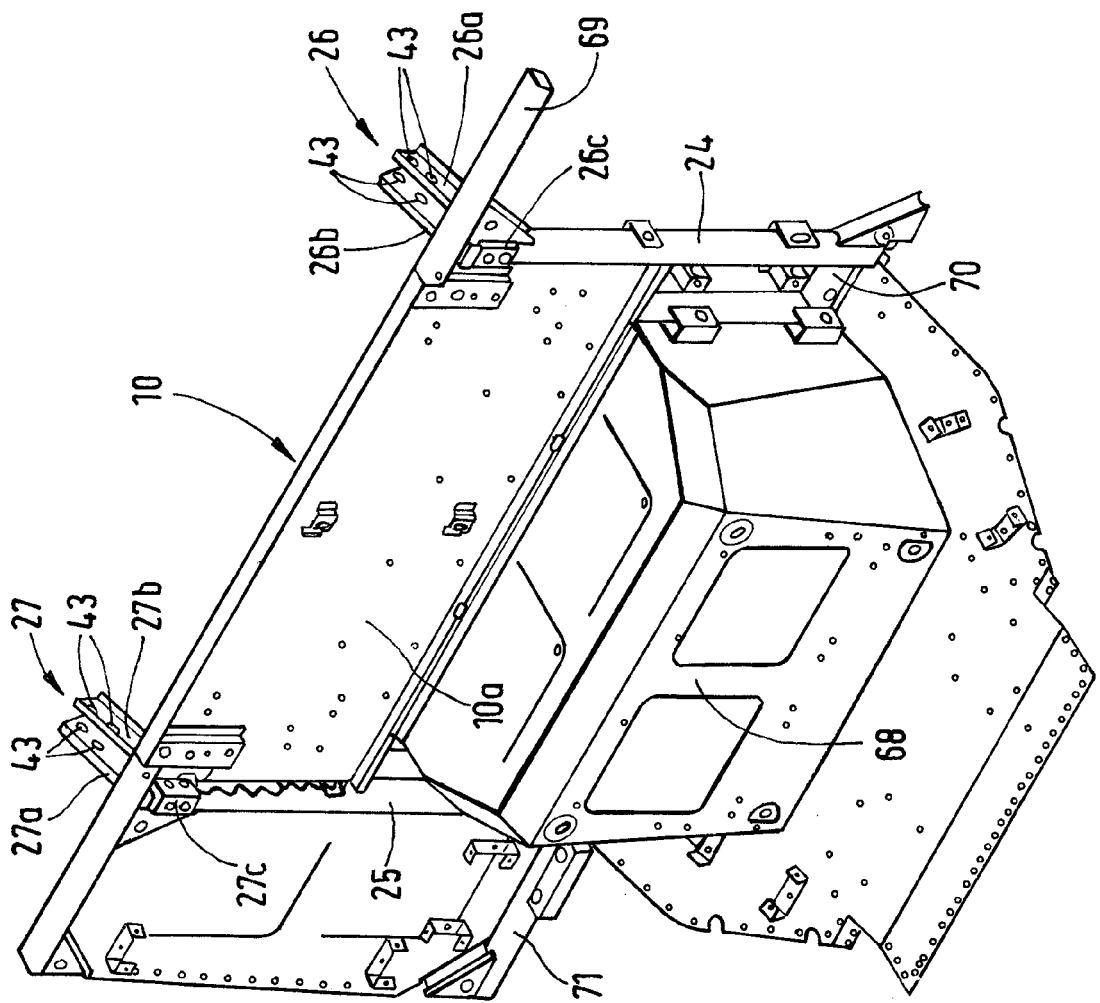
FIG. 10 depicts the rear wall assembly of the cab front module of FIG. 1 in perspective from top front left.
Figure 11:
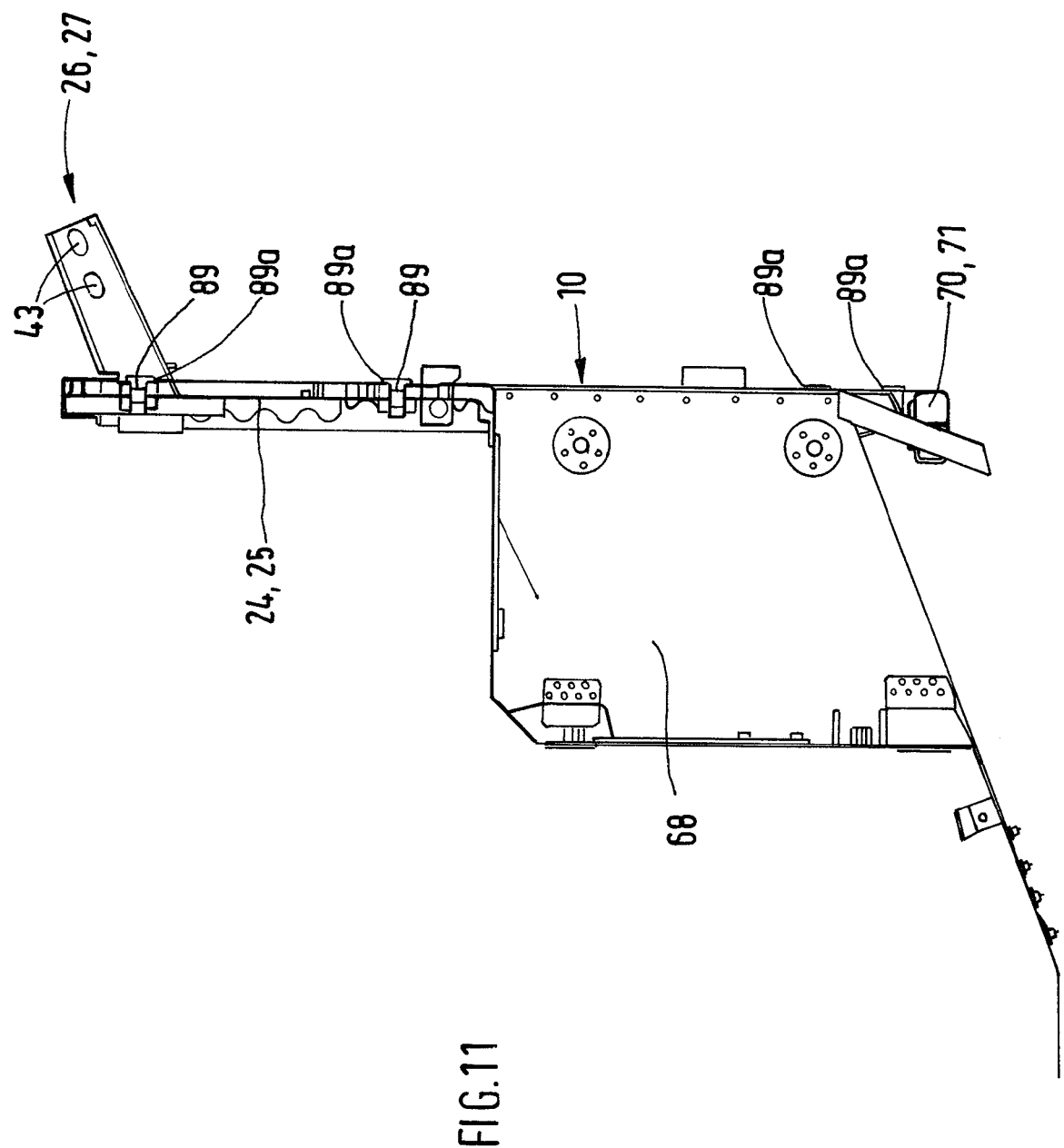
FIG. 11 depicts the rear wall assembly of the cab front module of FIG. 1 from the left.
Figure 12:
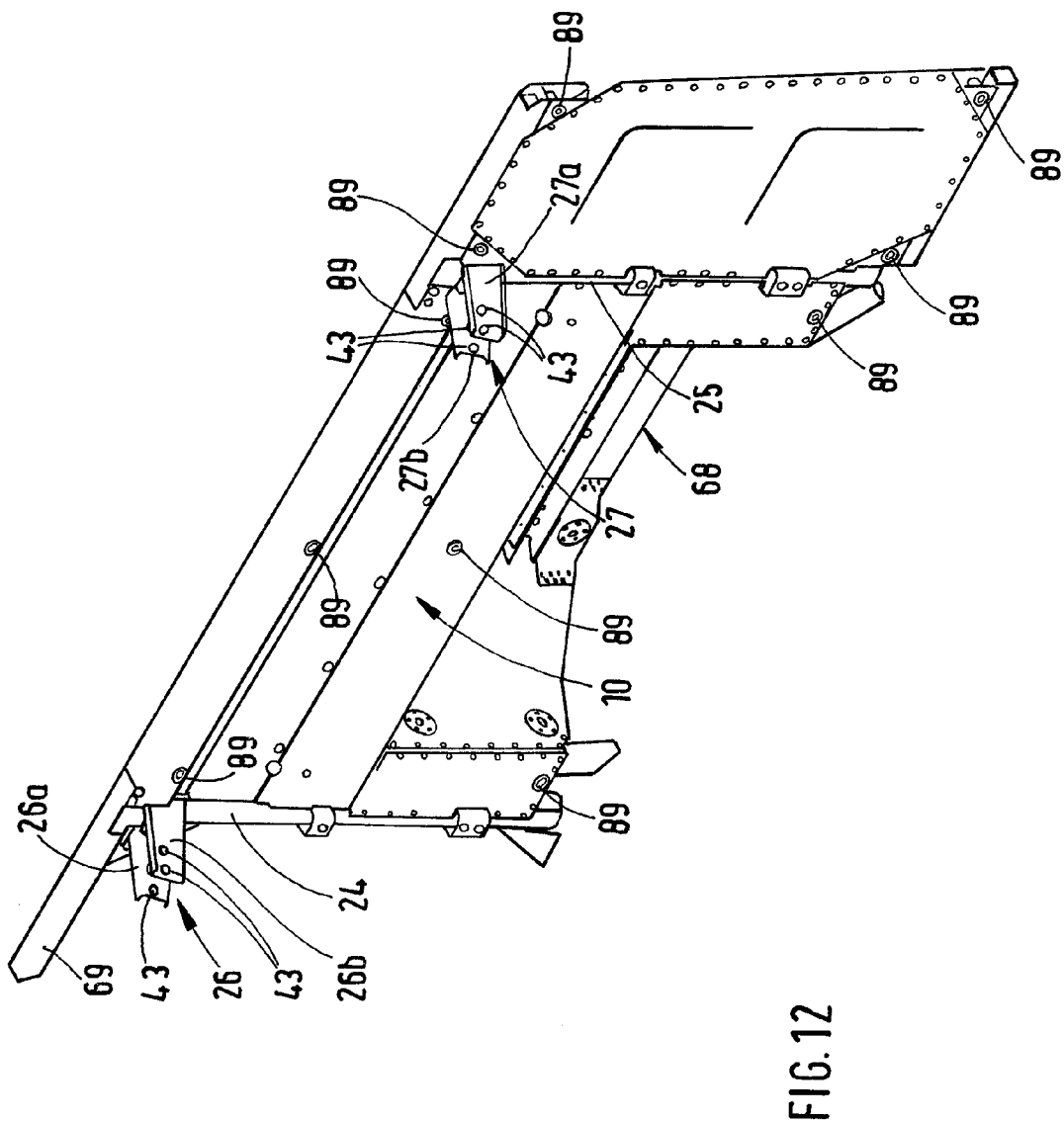
FIG. 12 depicts the rear wall assembly of the cab front module of FIG. 1 in perspective from rear right.
Figure 13:
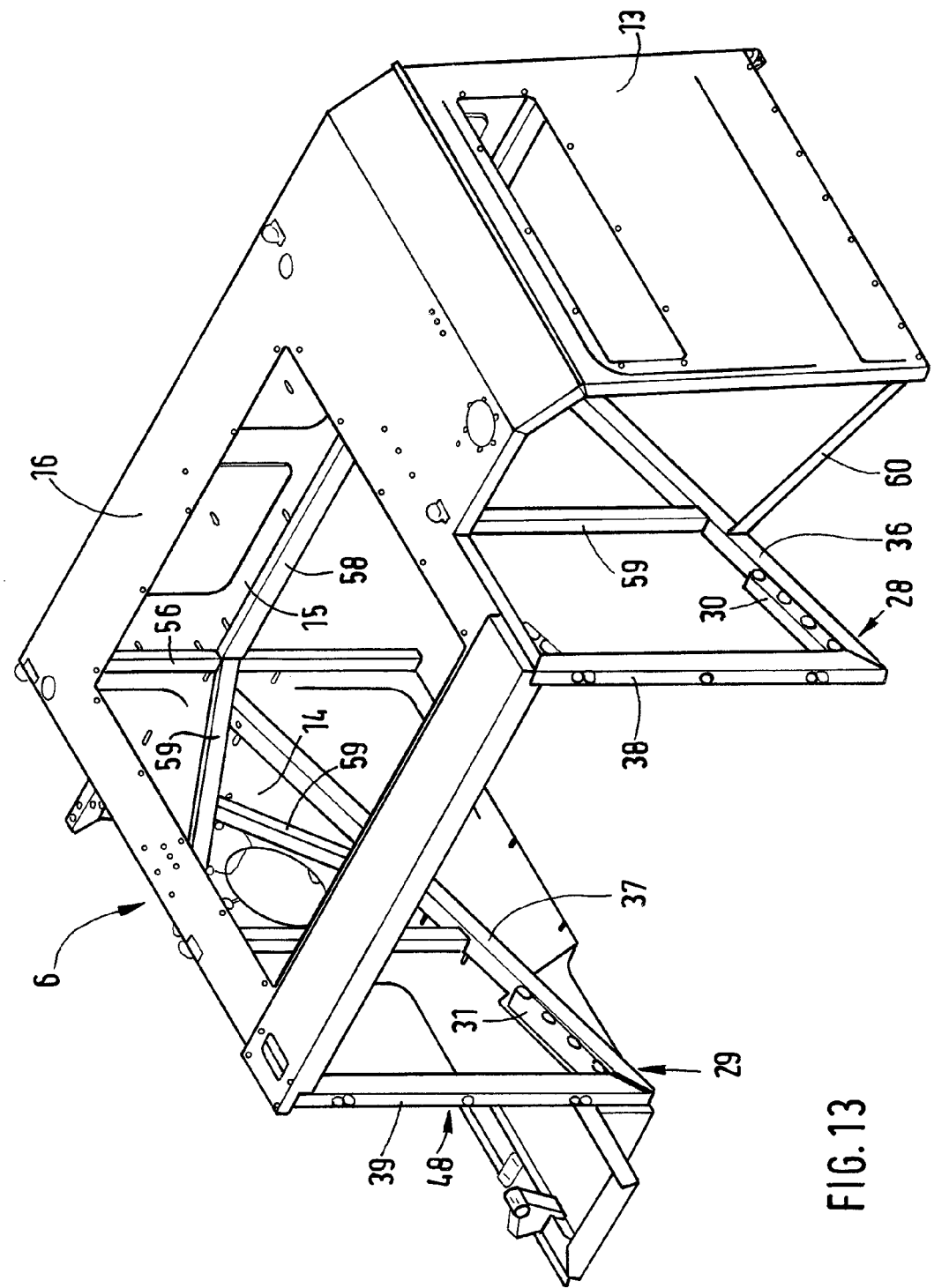
FIG. 13 depicts the cab rear module of FIG. 1 in perspective from top front left.

In the example shown in FIG. 1, the two front module supporting brackets 22, 23 extend behind the front module rear wall 10 on a plane parallel to the lengthwise vertical plane of the vehicle, and each exhibits a seating surface 34, 35 extending obliquely rearwards and upwards at the same acute angle to the horizontal. The matching means of support 28, 29 on the rear module are each formed by a section at the bottom front of a spar 36, 37 of the rear module bearer frame 17, whereby the undersides of these sections 28, 29 are at the same oblique angle to the horizontal as the matching seating surfaces 34, 35 on the front module supporting brackets 22, 23. In this way the cab rear module 6 is supported on the cab front module 5 by sloping ramps when in position for attachment to it.

As means for secure crosswise and vertical attachment of the rear module 6 to the front module 5 at their top there are two retaining brackets 26, 27, each arranged at the top of one of the vertical spars 24, 25 reinforcing the front module rear wall 10. These retaining brackets 26, 27 match means of attachment 32, 33 on the bearer frame 17 of the rear module 6.

In the illustrated example of implementation, each of the two front module retaining brackets 26, 27 extends behind the front module rear wall 10 on a plane parallel to the lengthwise vertical plane of the vehicle, obliquely upwards and rearwards at an acute angle to the horizontal, and is formed by a, seen in plan view, U-shaped punched sheet metal part, each of these having two parallel spaced side members 26a, 26b and 27a, 27b joined by a cross bar 26c and 27c. Each of these U-shaped retaining brackets 26, 27 is attached, preferably welded, to the top—gripping the front and sides—of one of the two vertical spars 24, 25 reinforcing the rear wall 10 of the front module 5. The matching top means of attachment 32, 33 on the rear module are each formed by holding plates attached in the corners between a front vertical spar 38, 39 and a top longitudinal spar 40, 41 of the rear module bearer frame 17. When the rear module 6 is in position for attachment to the front module 5, these bearer frame corners with the holding plates 32, 33 fit between the two side members 26a, 26b or 27a, 27b of one of the retaining brackets 26, 27, and each exhibits at least one through-hole 32', 33', flush with the through-holes 26', 27' in the side members 26a, 26b and 27a, 27b of the front module retaining brackets 26, 27, to hold screws 75 for attachment of the two cab modules 5, 6. These screws 75 grip—as clearly shown in FIG. 19—in threaded boreholes of nuts or thread plates 76 on the outside of the retaining brackets 26, 27 opposite the screw heads. This produces secure vertical and crosswise attachment of the rear module 6 to the front module 5 at the top.

The joining of the front module 5 and the rear module 6 in the illustrated example is as follows.

Figure 19:
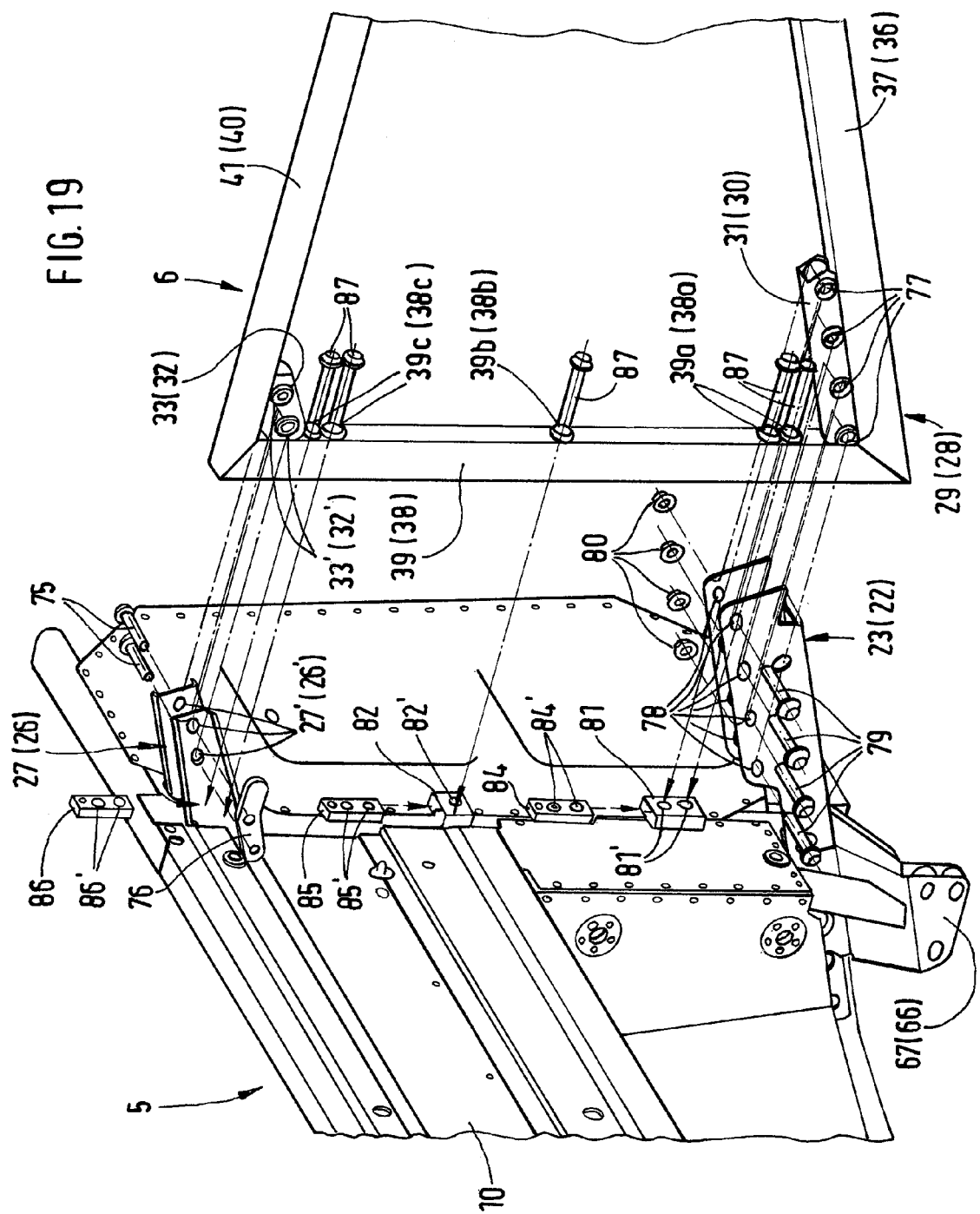
FIG. 19 depicts detailed view of the join between the cab front module and rear module.

The front module supporting brackets 22, 23 are formed by punched sheet metal parts that are attached to the ends of the longitudinal floor members 18, 19 and, at least for a large part of the resting and joining area for the lower rear module supporting means 28, 29 and attachment means 30, 31, exhibit a U-shaped, open-topped cross-section, whereby the bottoms 34, 35 in these cross-section regions essentially assume the supporting and carrying function and the side walls 22a, 22b and 23a, 23b with their crosswise through-holes 78 the crosswise and vertical securing plus attachment function for the rear module 6 when it is in place. The matching bottom means of attachment 30, 31 on the rear module are each formed by holding rails attached in the region of the supporting means 28, 29 on top of the spars 36, 37 of the rear module bearer frame 17. As shown in FIG. 19, when the rear module 6 is in position for attachment to the front module 5, the two front vertical spars 38, 39 and the two bottom spars 36, 37, with the holding rails 30, 31, of the rear module 17 behind them fit between the two side walls 22a, 22b or 23a, 23b of one of the supporting brackets 22 or 23, and the rear module 6 is seated with the supporting means 28, 29 of its bearer frame 17 on the bottoms 34, 35 of the supporting brackets 22, 23. Screws 79 are passed through the flush screw holes 78 and boreholes 77 and grip in threaded boreholes of nuts or thread plates 80 on the outside of the supporting brackets 22, 23 opposite the screw heads. This produces secure vertical and crosswise attachment of the rear module 6 to the front module 5 at the bottom.

For secure lengthwise support and attachment of the rear module 6 to the front module 5 the example uses the following means, which are well illustrated in FIG. 19.

For this purpose there are multiple—in this case three—stops and clips 81, 82, 83 attached, preferably welded, at different levels on each of the two vertical spars 24, reinforcing the front module rear wall 10. The stops and clips 81, 82, 83 are formed by punched sheet metal parts, have a U-shaped cross-section, and are welded onto the vertical spars 24, 25 by their side clips so that their outer plates are spaced a certain distance from the reverse side of the particular vertical spar 24, 25. In this way, in the region of the particular stop and clip 81, 82, 83 a pocket is formed into each of which a thread plate 8485 can be inserted with slight clearance, and is thus floating. The outer plate of each stop and clip 81, 82, 83 exhibits at least one through-hole 81', 82', 83' and an outer resting surface projecting from the rear of the front module rear wall 10 by a certain amount, and extending on a plane parallel to it.

The faces of the two front vertical spars 38, 39 of the rear module 6, when it is attached to the front module 5, stop against the three resting surfaces at different levels on the vertical spars 24, 25. In the vertical spars 38, 39 of the rear module bearer frame 17 there are through-holes 38a, 38b, 38c and 39a, 39b, 39c that, when the rear module 6 is in place for attachment to the front module 5, are flush with the through-holes 81', 82', 83' in the outer plates of the stops and clips 81, 82, 83 and through which retaining screws 87 can be threaded that grip in the threaded boreholes 84'85' of the thread plates 84', 85', 86'. Tightening the screws 87 causes the thread plates 84-86 in each stop and clip 81, 82, 83 to be pressed against the inner faces of their outer plates, and the faces of the vertical spars 38, 39 against the outsides of the stop plates. These friction locked connections produce a secure lengthwise connection between the rear module 6 and the front module 5.

Figure 20:
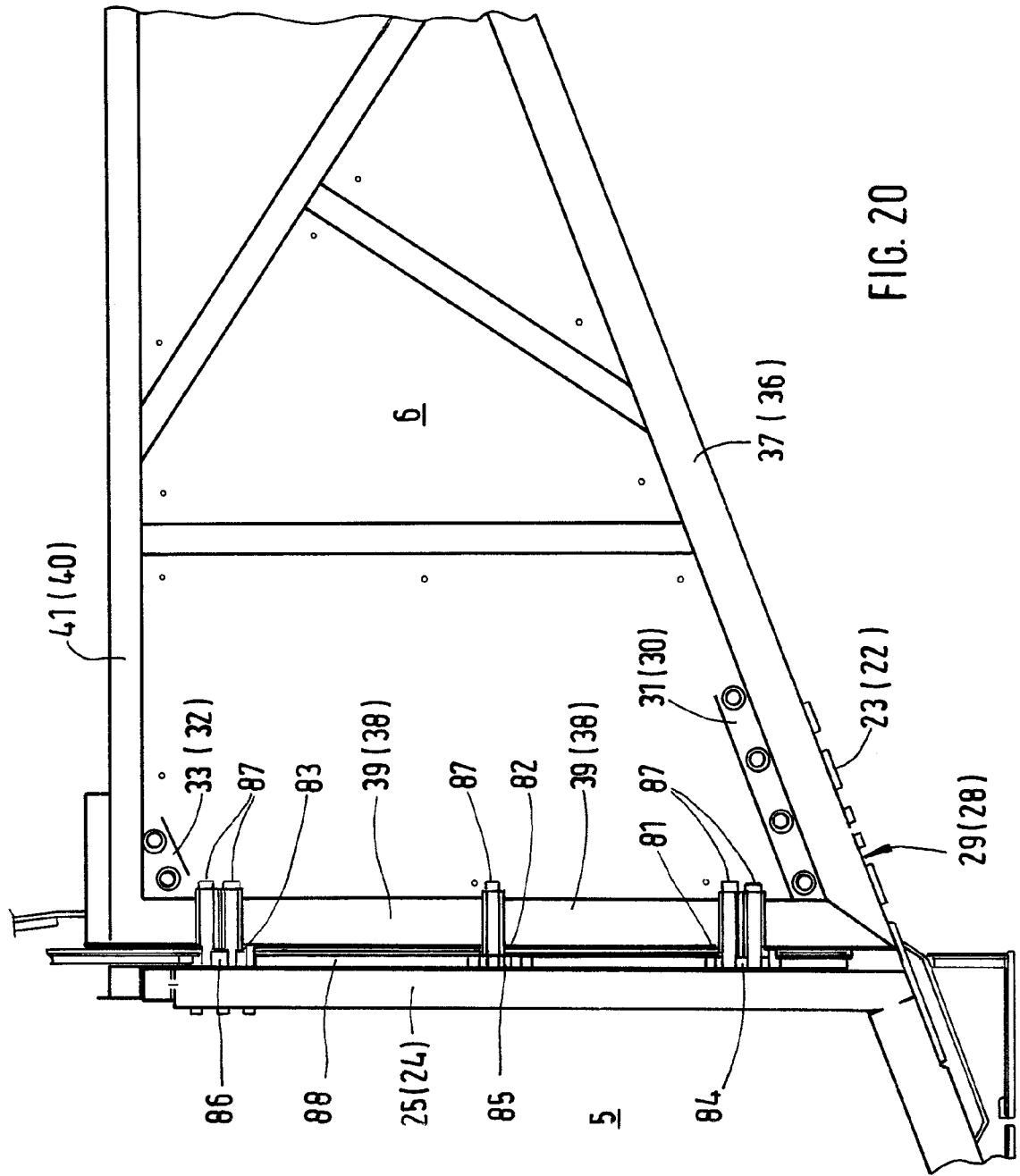
FIG. 20 depicts schematic section of the join between the cab front module and rear module.

In the illustrated example there is armouring 88 provided between the rear module 6 and the front module 5 (see FIG. 20). This armouring consists of multiple armour plates screwed to the front module rear wall 10.

As this example of implementation shows (see FIG. 1, 3, 5, 6), one of the two side walls 8, 9 of the cab front module 5—in this case 8—is longer than the opposite one. Furthermore, the rear of these two side walls 8, 9 differing in length is formed by an angled rear wall 10, creating, in addition to a for the most part straight rear wall section 10a, a cab alcove 46 projecting beyond this to the rear that is demarcated on the inside by a rear wall section 10b, at the back by a rear wall section 10c, and on top by an appropriate extension 12a of the roof 12. Matching this implementation the cab rear module 6 exhibits on the same side at the front a cutout 47 large enough to accommodate the cab alcove 46 projecting from the back of the front module 5 when the rear module 6 is attached to the front module 5. In this case the join between the front module 5 and the rear module 6 is made using the means intended for this purpose and already detailed, i.e. only behind the straight rear wall section 10a and not in the cab alcove 46 or the matching cutout 47.

In the illustrated implementation the cab rear module 6 also exhibits, on the side opposite the cutout 47, a space 48 to hold a spare wheel (not shown) and an accompanying lifting/lowering device (likewise not shown). This stowage space 48 is bordered on the inside by the side wall 14, offset inwards from the side wall 9 of the front module 5, a floor 49 and a rear bulkhead 50, but open towards the outside. The floor 49 is supported by a reinforcing carrier arrangement 51 that forms part of the rear module bearer frame 17.

A retaining plate 52 with sideways projecting bolts 53 is attached to the side wall 14 of the bearer frame 17 for stowage of the spare wheel.

In the illustrated example of implementation the bearer frame 17 of the rear module 6 consists of the following parts:
the two parallel front vertical spars 38, 39, spaced to fit into the front module supporting brackets 22, 23, and joined at the top by a cross spar 54 to form a portal open to the front;
two parallel rear vertical spars 55, 56, spaced like the front vertical spars 38, 39, joined by an upper cross spar 57 and a middle cross spar 58, forming with the vertical spars 55, 56 the reinforcement of the rear module rear wall 1S, and also joined to the front vertical spars 38, 39, the bottom oblique longitudinal spars 36, 37 and top longitudinal spars 40, 41 reinforcing or carrying the roof 16, whereby the particular spar array is reinforced by a grid arrangement of struts 59;
in addition to the previously described, portal-like part of the bearer frame, a framework strutted with this by cross spars 60, reinforcing the side wall 13, and composed of multiple single spars 61, 62, 63, 64, 65.

Each of the bottom longitudinal spars 36, 37 joins the bottom end of the front vertical spar 38, 39 to point backwards and upwards, and thus draw an acute angle to the horizontal with their undersides forming the supporting means 28, 29, said angle corresponding to that drawn to the horizontal by the seating surfaces 34, 35 on the front module supporting brackets 22, 23.

The floor 11 of the cab front module 5 together with the longitudinal floor members 18, 19, the supporting brackets 22, 23 attached to their ends and further built-on parts such as brackets 66, 67 for the rear cab suspension are fully prefabricated and preassembled as a separate floor assembly.

The rear wall 10 of the cab front module 5 together with the spars 24, 25 and other spars 69, 70, 71 reinforcing it, the retaining brackets 26, 27 attached to the spars 24, and further built-on parts such as an engine compartment hood 68 are fully prefabricated and preassembled as a separate rear wall assembly.

The prefabricated floor unit and rear wall unit are joined together and to the other walls 7, 8, 9 and roof 12 of the cab front module 5 while a body in white.

The cab rear module 6 and the cab front module 5 are also each separately prefabricated and preassembled. In final assembly of the cab these two preassembled modules 5, 6 are joined at the ready prepared points and screwed together.

The cab 1 composed of the two modules 5, 6 is attached to the chassis frame 4 of the utility vehicle in a way that allows it to be tilted, as indicated in FIG. 18. The front suspension of the cab is by front bearings 2, 3 in the region of the front floor bearing cases 20, 21 in conjunction with bearing brackets in the front of the chassis frame 4. The rear cab suspension in the illustrated implementation, as shown in FIG. 18, is about halfway along the ready assembled cab 1, but still in the region of the floor 11 of the cab front module 5, over locking elements 69, 70 attached to floor brackets 66, 67 that interact with locks 44, 45 arranged on frame brackets 42, 43.

With the rear part of the front module 5 and the front part of the rear module 6, the inventive cab covers a power aggregate installed between the two longitudinal members of the chassis frame 4, and that usually consists of an internal combustion engine, a clutch and a gear shift or automatic transmission. The rear module 6 of the cab 1 serves on the one hand as a protective hood for aggregates and parts attached beneath it to the chassis frame 4, such as the power aggregate, radiator, fan, and on the other hand as stowage space for other vehicle aggregates and parts, accessories and the spare wheel, etc.

The invention claimed is:

1. A utility vehicle comprising:
a frame; and
a cab tiltingly arranged on the frame, the cab comprising:
a front module forming a cabin for a driver and co-driver of the utility vehicle and comprising:
a front wall;
a pair of side walls;
a rear wall, the rear wall having a plurality of boreholes
a floor reinforced by two longitudinal floor members; and
a roof;
a supporting bracket attached to each of the longitudinal floor members, each of the supporting brackets projecting through the rear wall;
and
a rear module supported by the supporting brackets, the rear module comprising:

a bearer frame;
a plurality of walls configured to form at least one of a protective shield and a storage space, at least one of said plural walls facing the rear wall of the front module having a plurality of boreholes corresponding to the plural boreholes in the rear wall; and
rear supports configured to rest on the supporting brackets,
wherein the rear supports and supportive brackets are configured to support the rear module on the front module,
wherein the plural boreholes are configured to couple the front module and the rear module about a plurality of axes at different levels.

2. The utility vehicle according to claim 1, wherein each of the supporting brackets extends beyond the rear wall of the front module on a plane parallel to a lengthwise plane of the utility vehicle, each of the supporting brackets having a seating surface extending rearwards; and wherein the rear supports are arranged on a lower spar of the bearer frame, a bottom edge of the rear supports configured to mate with the seating surface of the supporting brackets, the supporting brackets and the rear supports arranged at a same oblique angle with respect to a horizontal axis.

3. The utility vehicle according to claim 1, further comprising at least one retaining bracket provided at a top of a vertical spar configured to reinforce the rear wall of the front module, the bearer frame having at least one attachment element configured to mate with the retaining bracket, the at least one retaining bracket and the at least one attachment element joined by at least one threaded element.

4. The utility vehicle according to claim 3, wherein each of the supporting brackets extends obliquely rearwards and upwards at an acute angle to the horizontal behind the rear wall of the front module with respect to a plane parallel to the lengthwise vertical plane of the vehicle, and the rear supports are each formed by a holding plate attached in a corner between a vertical spar and an upper longitudinal spar of the rear module bearer frame, said retaining bracket comprising at least one crosswise borehole with which, when the rear module is in position for attachment to the front module, crosswise holes in the supporting brackets correspond to the at least one crosswise borehole configured to secure vertical and crosswise attachment of the front and rear modules.

5. The utility vehicle according to claim 1, wherein the front module supporting brackets are formed by punched sheet metal parts that are attached to ends of the two longitudinal floor members, and at least part of the supporting brackets and the rear supports are configured as a U-shaped, open-topped cross-section,
wherein bottoms of the U-shaped, open-topped cross-section are configured for supporting and carrying the rear module and side walls of the U-shaped, open-topped cross-section are configured for the crosswise and vertical securing and attachment functionality of the rear module.

6. The utility vehicle according to claim 5, wherein the rear supports are formed by holding rails attached at a top of spars having oblique faces serving as a support and exhibiting multiple crosswise boreholes, the multiple crosswise boreholes configured for attachment to the front module.

7. The utility vehicle according to claim 4, wherein the support brackets are formed by a U-shaped, punched sheet metal part, comprising of two parallel spaced side members joined by a cross bar, the support brackets are attached to the vertical spars configured to reinforce the rear wall of the front module,
wherein, when the rear module is in position for attachment to the front module the rear module rear supports formed by holding plates each fit into the side members of the particular support bracket.

8. The utility vehicle according to claim 1, further comprising a plurality of stops and clips configured for lengthwise support and attachment of the rear module to the front module, the stops and clips arranged at different levels of each of two vertical spars, the vertical spars configured to reinforce the front module rear wall, outer plates of the plural stops and clips each having at least one through-hole and a seating surface projecting beyond the front module rear wall by a certain length for attachment to the rear module by vertical framework spars, the vertical spars having a thread plate including at least one threaded hole and through-holes are provided in the vertical spars of the rear module bearer frame that are flush with the through-holes in the stops and clips when the rear module is in place for attachment on the front module, and through which threaded screws are passed that are screwed into the threaded holes of the thread plates.

9. The utility vehicle according to claim 1, wherein one of the two front module side walls is longer than the other front module side wall, configured to form a first straight rear wall section and an alcove projecting beyond the first straight rear wall section.

10. The utility vehicle according to claim 9, wherein the cab rear module further comprises a cutout configured to accommodate the projecting cab alcove of the front module.

11. The utility vehicle according to claim 10, wherein the cab rear module further comprises a space opposite the cutout configured to hold at least one of a spare wheel and jack, the space bordered by at least one of one of the plural walls, the one of the plural walls offset inwards from the side wall of the front module on a same side, a floor, and a rear bulkhead.

12. The utility vehicle according to claim 1, wherein the rear module bearer frame further comprises a portal-like bearer frame, the portal-like bearer frame comprising:
two front vertical spars, parallel to one another and spaced to fit the front module supporting brackets;
a top spar configured to join the two front vertical spars is at a top of the two front vertical spars;
two parallel, rear vertical spars spaced from the front vertical spars and joined by an upper cross spar and a middle cross spar;
bottom longitudinal spar and upper longitudinal spars configured to join the front vertical spars to the rear vertical spars,
wherein each of the spars is reinforced internally by struts arranged in grid-like fashion, and the portal-like bearer frame structure comprises at least one cross spars configured to reinforce one of the side walls.

13. The utility vehicle according to claim 12, wherein the bottom longitudinal spars of the rear module bearer frame join a bottom end of the front vertical spars configured to point backwards and upwards, forming an acute angle to the horizontal with their respective undersides forming the rear supports, said angle corresponding to horizontal seating surfaces on the front module supporting brackets.

14. The utility vehicle according to claim 1, wherein the floor of the front module, the longitudinal members, and the supporting brackets attached to their ends and further at least one bracket are configured to form an independent, fully prefabricated, and preassembled unit.

15. The utility vehicle according to claim 14, wherein the rear wall of the front module, a plurality of framework spars configured to reinforce the front module, retaining brackets, stops and clips attached to the spars, and a wall assembly form an independent, fully prefabricated, and preassembled unit.

16. Utility vehicles according to claim 15, wherein the floor unit and the rear wall unit, after their separate manufacture, are joined together and to the front wall, side walls, and roof of the front module.

17. The utility vehicle according to claim 1, wherein the front module and the rear module are each separately prefabricated and preassembled units that in final cab assembly can be joined at the readied points and then screwed together and released.

* * * * *